(12) United States Patent
Buzzell

(10) Patent No.: US 6,516,555 B2
(45) Date of Patent: Feb. 11, 2003

(54) FLY FISH LURE HOLDER

(76) Inventor: Charles H. Buzzell, P.O. Box 307, Milo, ME (US) 04463

( * ) Notice: Subject to any disclaimer, the term of this patent is extended or adjusted under 35 U.S.C. 154(b) by 0 days.

(21) Appl. No.: 09/805,104

(22) Filed: Mar. 14, 2001

(65) Prior Publication Data

US 2002/0129538 A1 Sep. 19, 2002

Related U.S. Application Data

(60) Provisional application No. 60/202,822, filed on May 8, 2000.

(51) Int. Cl.⁷ ............................................. A01K 97/06
(52) U.S. Cl. ................................................... 43/57.1
(58) Field of Search ................... 43/54.1, 57.1; 206/315.11

(56) References Cited

U.S. PATENT DOCUMENTS

| | | | |
|---|---|---|---|
| 461,921 A | 10/1891 | Preston | |
| 869,614 A | 10/1907 | Bennett | |
| 1,993,144 A | 3/1935 | Kasdan | |
| 2,540,340 A | * 2/1951 | Linblade | ............... 43/57.1 |
| 3,197,915 A | 8/1965 | Staver | |
| 3,346,313 A | 10/1967 | Fee | |
| 3,461,599 A | 8/1969 | Sylvester | |
| 3,507,071 A | 4/1970 | Bryson | |
| 3,546,709 A | * 12/1970 | Cross | ............... 43/57.1 |
| 3,680,750 A | * 8/1972 | Franco | ............... 224/5 |
| 4,020,584 A | 5/1977 | Michal | |
| 4,596,329 A | 6/1986 | Eldridge, Jr. | |
| 4,653,220 A | 3/1987 | Olsen, Sr. | |
| 4,697,379 A | * 10/1987 | McPhaul | ............... 43/54.1 |
| 4,826,059 A | * 5/1989 | Bosch | ............... 224/183 |
| 4,942,691 A | * 7/1990 | Hwang | ............... 43/57.1 |
| 4,958,760 A | 9/1990 | Bunten | |
| 5,410,836 A | * 5/1995 | Hardy | ............... 43/57.1 |
| 5,426,885 A | 6/1995 | Wittman | |
| 5,526,927 A | * 6/1996 | McLemore | ............... 206/315.11 |
| 5,704,158 A | 1/1998 | Whiteaker | |

* cited by examiner

*Primary Examiner*—Kurt Rowan
(74) *Attorney, Agent, or Firm*—Shlesinger, Arkwright & Garvey LLP

(57) ABSTRACT

This invention pertains to fly fish lure holders having magnetic means for securing the fly to the holder in a manner that the fly is not accidentally dislodged from its securing magnet, since the securing magnet is vertically mounted in a slot permitting securement of the entire side of the fly rather than a hook end.

13 Claims, 3 Drawing Sheets

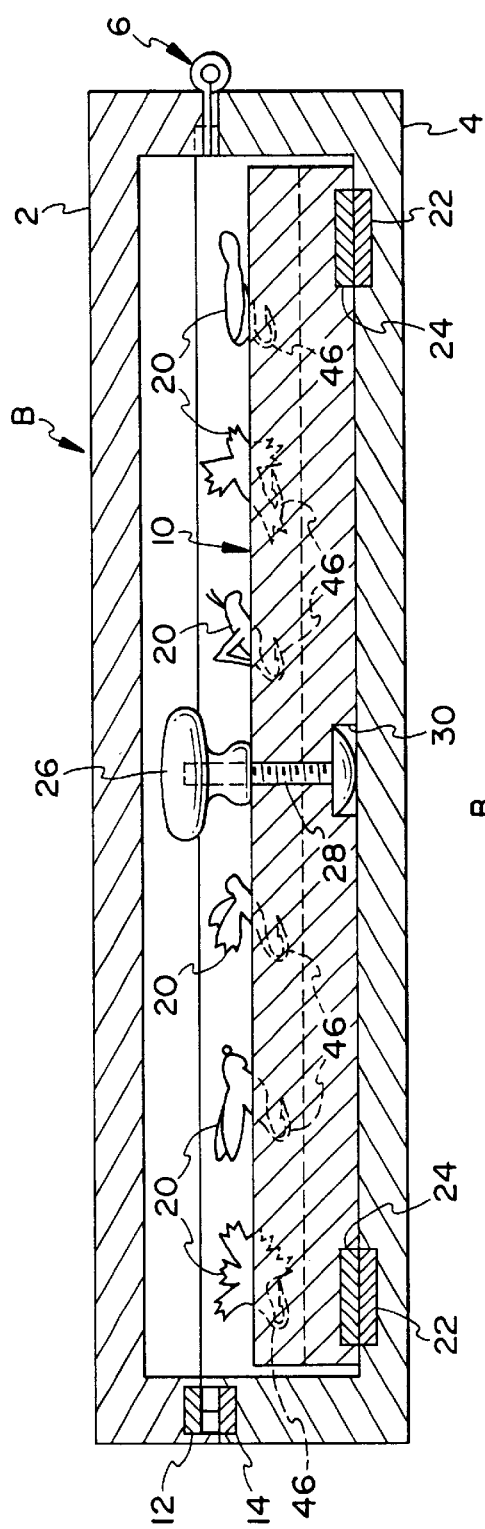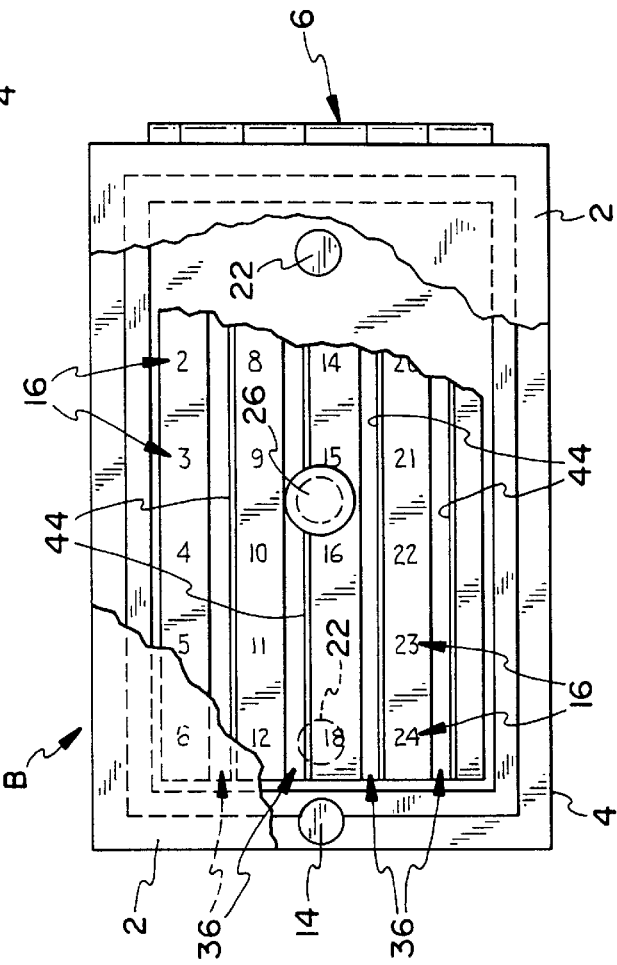

FLY FISH LURE HOLDER

RELATED APPLICATION

This application is a nonprovisional utility application based on Provisional Application Ser. No. 60/202,822, filed May 8, 2000, and is hereby incorporated by reference and whose priority benefit is hereby claimed.

FIELD OF THE INVENTION

This invention pertains to fly fish lure holders having a series of parallel slots with magnetic means for maintaining the flies secure and individually spaced from each other.

HISTORICAL BACKGROUND

In the past, there have been a number of holders for fly fish lures including Fee, U.S. Pat. No. 3,346,313; Preston, U.S. Pat. No. 461,921; Olsen, U.S. Pat. No. 4,653,220; Pryson, U.S. Pat. No. 3,507,071; and, Sylvester, U.S. Pat. No. 3,461,599. These references have non-magnetic means for supporting or otherwise securing the fly lure in place. Kasdan, U.S. Pat. No. 1,993,144; Staver, U.S. Pat. No. 3,197,915; and, Michal, U.S. Pat. No. 4,020,584, disclose magnetic type fly fish lure holders with means for identifying each individual fly.

In addition to fly tackle boxes, there are tackle totes such as Wittman, U.S. Pat. No. 5,426,885 and Whiteaker, U.S. Pat. No. 5,704,158, which organize lures of larger sizes and fly lures.

OBJECTS AND SUMMARY OF THE INVENTION

It is an object of this invention to provide a fly fishing lure holder which magnetically retains the lure securely in the box against accidental removal.

Another object of this invention is to provide a fly fish lure holder which will maintain the fly fish lure in the holder without exposing the fisherman to the danger of snagging the hook of the lure in his hand or fingers.

A further object of this invention is to provide a fly fish lure holder which will maintain the flies in proper sequence with identifying means for each fly.

Yet a further object of this invention is to provide a fly fish lure holder and tackle box in which the holder is maintained securely in a tackle box by magnetic means which will not be affected by weather, water and corrosive fluids and the like.

Another object of this invention is to provide a fly fish lure holder and tackle box which will provide a means for readily removing the holder from the box.

Still a further object of this invention is to provide a holder for lures which will maintain its ability to retain lures for years without requiring replacement of parts.

Yet another object of this invention is to provide a lure box for fishing flies which is easily and inexpensively manufactured.

In summary, this invention pertains to a fly fish lure holder and tackle box which provides ready access to the fisherman without a likelihood of his injuring himself and the likelihood of dislodging and losing his lures.

These and other objects of the present invention will be apparent from the following description including the following drawings which are identified as follows:

BRIEF DESCRIPTIONS OF THE DRAWINGS

FIG. 4 is a cross-sectional view taken along the line 4—4 of FIG. 3 and viewed in the direction of the arrows;

FIG. 5 is a top plan view with portions shown broken away.

DETAILED DESCRIPTION OF THE INVENTION

Figure 1:
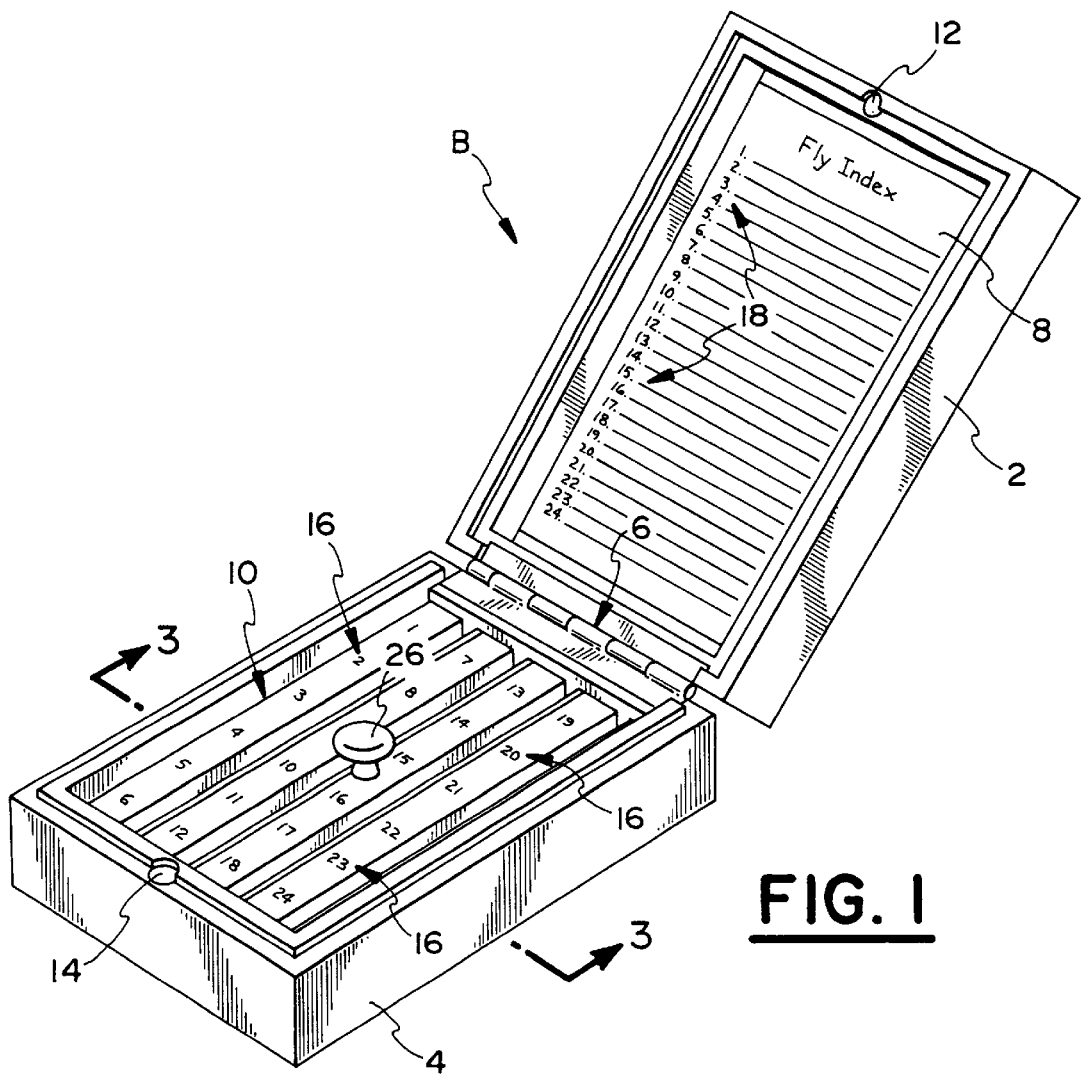
FIG. 1 is a perspective view of the tackle box with the holder positioned therein.

FIG. 1 shows a tackle Box having a lid 2 shown open for closing on the receptacle 4. The lid 2 is shown secured to the receptacle 4 by a hinge 6. Within the lid 2 is a fly index 8. The tackle Box can be constructed of wood, metal, and preferably of plastic material. The fly index 8 may be a card which can be slipped into the lid 2 and secured by adhesive or inserted (FIG. 3) or otherwise printed or stamped on the inside of the lid 2. The fly index 8 will carry the names of the various flies in numbered sequence as shown in FIG. 1.

Receptacle 4 is designed to receive a fly fish lure holder or support block 10 having a thickness substantially greater than the width of the hook of a fly fish lure.

The lid 2 at the end opposite the hinge 6 is provided with a magnet 12 which will engage the magnet holddown 14 on the receptacle 4, as illustrated in FIG. 4. It is obvious that other latching means can be provided for the tackle Box, such as a latch hook mechanism, a twist lock or the like.

Figure 2:
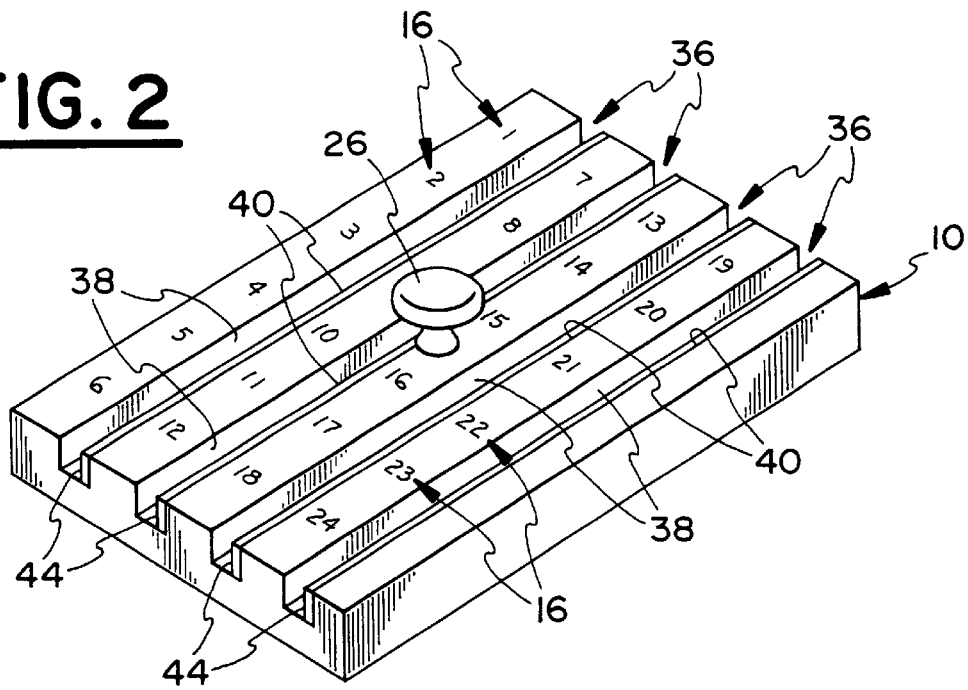
FIG. 2 is perspective view of the fly fish lure holder.

The fly fish lure holder 10, as shown in FIGS. 1 and 2, is provided with indicia 16 which corresponds to the indicia 18 on the fly index 8. Indicia 16 can be printed or stamped or otherwise labeled on the fly fish lure holder 10.

Fly lures 20 are shown mounted on the fly fish lure holder 10 in FIG. 4.

Mounted in the bottom of the receptacle 4 are magnets 22. The magnets 22 react with magnet holddowns 24 mounted in the bottom of the fly fish lure holder 10. It is obvious that magnet holddowns 14 and 24 may be magnetized or of magnetic material and that the magnetic material can be substituted with the magnets 12 and 22 with magnets substituted for magnetic holddowns 14 and 24 which may be of magnetic attractive material.

A knob 26 is provided in the fly fish lure holder 10 for lifting the fly fish lure holder 10 from the receptacle 4 to obtain ready access for cleaning out the receptacle 4 as well as cleaning the fly fish lure holder 10. A removal of the fly fish lure holder 10 from the receptacle 4 also allows for ease and access to the flies 20.

The knob 26 may be screwed on to a screw 28 which rests in a recess 30 in the bottom of the fly fish lure holder 10 (FIG. 4).

Figure 3:
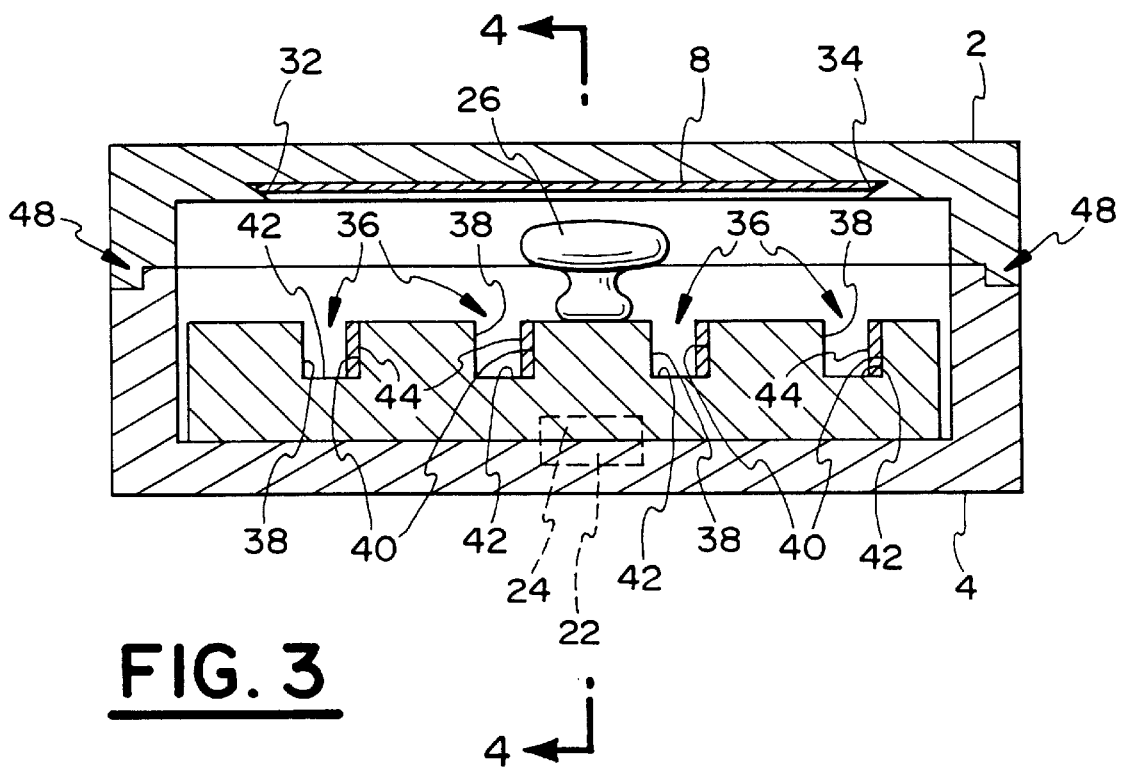
FIG. 3 is a cross-sectional view taken along the line 3—3 of FIG. 1 and viewed in the direction of the arrows.

It should be noted in FIG. 3, that the fly index 8 is shown mounted in the grooves 32 and 34 of the lid 2.

As best shown in FIGS. 2 and 3, the fly fish lure holder 10 includes a series of parallel slots 36 which run lengthwise of the fly fish lure holder 10. The slots are designed to be slightly wider than the hook of the fly fish lures 20. The slots 36, as best shown in FIG. 3, have side walls 38 and 40 and a bottom wall 42. Adjacent the side walls 40 of the slots 36, are magnetic strips 44 which extend the length of the slots 36. The magnetic strips also extend from the top edge of the slots 36 to the bottom of the slots 42. The distance between the side walls 38 of the parallel slots 36 and the magnetic strips 44 is slightly larger than the maximum thickness of the fly lures 20 and hooks 46.

It should be noted in FIG. 3 that there is an interlock seal 48 between the lid 2 and the receptacle 4, so that when the tackle Box is closed, water or the like will not easily run into the receptacle 4. The hinge 6 is also designed to keep water from running into the receptacle 4 when the lid 2 is closed onto the receptacle 4.

It will now be apparent that the lures 20 will have maximum security to the magnetic strips 44 as they will be secured to the magnetic strips 44 a maximum length of the hooks 46 and not just at the tip. It will also be noted that the hooks will be located beneath the top surface of the receptacle 4 so as to avoid accidental contact with the fingers or hands of the fisherman. This safety factor is important. It should be further noted that the strips 44 are designed so that the hooks 46 do not have to be placed exactly on a center but can be moved up and down the strips as desired for easy removal or for positioning.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A fly fish lure holder for fly fish lures comprising:
   a) a support block having a thickness substantially greater than the width of the hook of a fly fish lure;
   b) said support block having a top, a bottom, first and second end walls and first and second sides;
   c) a series of parallel slots in said top extending from said first end wall to said second end wall;
   d) said slots having a depth approximately the width of the hook of a fly fish lure;
   e) each of said slots having a bottom and side walls;
   f) a magnetic strip for each of said slots mounted on only one of each of said slots side walls and extending from adjacent said support block top to adjacent said slot bottom;
   g) the distance from said magnetic strip mounted on only one of each of said slot's side walls to the other of said slot's side walls exceeding the thickness of a fly hook; and,
   h) whereby, a fly fish lure may be inserted into said slot and safely magnetically held by said magnetic strip until removal of the fly fish lure as required.

2. A fly fish lure holder as in claim 1 and including:
   a) a box having a movable top for containing said fly fish lure holder when the fly fish lures are not in use.

3. A fly fish lure holder as in claim 2 and wherein:
   a) said box includes magnetic means for preventing said fly fish lure holder from falling out of said box if tipped over.

4. A fly fish lure holder as in claim 2 and wherein:
   a) said fly fish lure holder includes a handle on said support block top for ease in removal from said box.

5. A fly fish lure holder as in claim 3 and wherein:
   a) said magnetic means includes a pair of cooperating magnetic holddowns, and;
   b) one of said pair of cooperating magnetic holddowns being in said box and the other of said pair of said cooperating magnetic holddowns being in said fly fish lure holder.

6. A fly fish lure holder as in claim 1 and including:
   a) spaced indicia adjacent said slots for quickly identifying one lure from another.

7. A fly fish lure holder as in claim 2 and wherein:
   a) said box includes a tabulation of the lures contained in said box; and,
   b) said fish lure holder includes spaced numerical indicia adjacent said slots correlated with said tabulation of the lures.

8. A fly fish lure holder as in claim 2 and wherein:
   a) said box is molded plastic.

9. A fly fish lure holder as in claim 8 and wherein:
   a) said support block is molded plastic.

10. A fly fish lure holder as in claim 9 and wherein:
    a) said movable top is hinged to said box.

11. A fly fish lure holder as in claim 7 and wherein:
    a) said tabulation is contained in said movable top of said box.

12. A fly fish lure holder as in claim 1 and wherein:
    a) said magnetic strips extend the length of said slots.

13. A fly fish lure holder as in claim 2 and including:
    a) magnetic latching means on said box for maintaining said box closed.

\* \* \* \* \*